United States Patent [19]
Zeng

[11] Patent Number: 5,456,339
[45] Date of Patent: Oct. 10, 1995

[54] NOISE ATTENUATED BRAKE FRICTION MEMBER

[75] Inventor: Li J. Zeng, Ann Arbor, Mich.

[73] Assignee: AlliedSignal Inc., Morristown, N.J.

[21] Appl. No.: 217,300

[22] Filed: Mar. 23, 1994

[51] Int. Cl.⁶ .................................................. F16D 65/00
[52] U.S. Cl. ........................... 188/250 E; 188/73.1
[58] Field of Search ............... 188/250 E, 250 B, 188/71.1, 73.1, 73.31, 218 A, 256 R

[56] References Cited

U.S. PATENT DOCUMENTS

| | | | |
|---|---|---|---|
| 1,855,027 | 4/1932 | Loughead | 188/250 E |
| 2,015,829 | 10/1935 | White | 188/250 E |
| 2,195,262 | 3/1940 | Rasmussen | 188/250 E |
| 3,807,533 | 4/1974 | Ohtani | 188/73.1 |
| 4,393,960 | 7/1983 | Mazur et al. | 188/250 E |
| 4,705,146 | 11/1987 | Tarter | 188/73.1 |
| 4,773,512 | 9/1988 | Murakami | 188/250 E |
| 5,145,037 | 9/1992 | Kobayashi et al. | 188/250 B |

FOREIGN PATENT DOCUMENTS

| | | | |
|---|---|---|---|
| 0117925 | 7/1984 | Japan | 188/250 E |
| 2148424 | 5/1985 | United Kingdom | 188/73.1 |

*Primary Examiner*—Matthew C. Graham
*Attorney, Agent, or Firm*—Leo H. McCormick, Jr.; Larry J. Palguta

[57] ABSTRACT

A method of attenuating audible sounds generated during a brake application through the engagement of a friction member with a rotating member. The brake is evaluated by modal and frequency response analysis to determine the natural frequencies generated during a brake application and identify the natural frequencies that create audible sounds. The locations on the friction member are identified which are most sensitive to generate audible sounds. Thereafter, portions of the friction material at the most sensitive locations are removed to change the natural frequency and attenuate the development of audible sounds.

7 Claims, 2 Drawing Sheets

| before modification | | after modification | |
|---|---|---|---|
| Freq. (Hz) | SPL (dB) | Freq. (Hz) | SPL (dB) |
| 10272 | 67.6 | 10304 | 44.0 |
| 10080 | 62.9 | 10336 | 48.7 |
| 10048 | 66.4 | 10304 | 47.4 |
| 10048 | 65.3 | 10368 | 47.7 |
| 10048 | 52.8 | 10368 | 47.1 |
| 10048 | 53.5 | 10368 | 51.8 |
| 10272 | 63.4 | 10368 | 54.4 |
| 10304 | 75.5 | 10368 | 55.6 |
| 10272 | 74.3 | 10368 | 54.7 |
| 10272 | 75.6 | 10336 | 55.8 |
| 10304 | 75.5 | 10304 | 62.9 |
| 10048 | 75.6 | 10304 | 56.3 |
| average | 72.0 | average | 55.3 |

NOISE ATTENUATED BRAKE FRICTION MEMBER

This invention relates to a method of reducing noise generated during a brake application by the removal of portions of a friction member at locations most sensitive to the natural frequencies that produce audible sounds.

BACKGROUND OF THE INVENTION

Attempts have been made to reduce or mask noise generated during a brake application through the application of a sound coating on backing plates as disclosed in U.S. Pat. No. 3,998,301, the location of a screen member between the friction member and backing plate as disclosed in U.S. Pat. No. 4,154,322, the use of discrete friction members as disclosed in U.S. Pat. No. 4,315,563, selecting the shape of a friction pad whose engagement surface is less than the nodal diameter of a frequency that would create undesirable noise as disclosed in U.S. Pat. No. 4,705,146 and through modification of ingredients in the friction material. The methods and structure to reduce noise as disclosed in the prior art has not been widely accepted by the automobile industry primarily because of the added cost associate for such brake systems.

It is known that most structures vibrate and such vibration is often the result of dynamic forces applied to such structures. The vibration of the structures in frequency domain is a product of the structure response spectrum and the spectrum of the applied dynamic force. This is the basis of frequency response analysis. The structure response can be studied by modal analysis through which the modal parameters of the structure (natural frequencies, modal damping and mode shapes) can be identified, and ultimately a modal model of the structure can be constructed based on these modal parameters. From experimentation it has been determined that noise can essentially be generated with each brake system under specific force applications of the associated friction pads.

SUMMARY OF THE INVENTION

During evaluation of a brake system which included a caliper, associated brake linings and a rotor in a dynamometer, high frequency noise was observed. Modal analysis and frequency response analysis was performed on the brake system to determine the natural frequencies generated during a brake application. Sensitivity analysis was further performed to identify specific locations on the brake lining points most sensitive to vibration should also change or attenuate the development of audible brake noise. A plurality of holes where drilled into the brake lining at the most sensitive points and the brake system again evaluated with respect to noise. The sound pressure level of the brake system with such modification of the brake lining was reduced on an average of 40 percent which is an acceptable level for most applications.

It is an object of this invention to provide a method of attenuating the development of audible frequencies generated during a brake application through a modification of a brake lining.

It is a further object of this invention to provide a method of selecting a location on a brake lining most sensitive to the development of audible frequencies and modifying the brake lining to reduce the vibration frequencies at that point.

These objects should be apparent from reading this specification while viewing the drawings.

DETAILED DESCRIPTION OF THE INVENTION

During dynamometer evaluation of a friction pad, the brake system produced an average sound pressure level of 72 dB at around 10100 Hz. In order to evaluate audible frequencies created during a brake application, modal analysis was performed on brake pads to build the modal model of the pads, then frequency response analysis was performed to the brake system by using the pad modal model as input excitation was introduced to determine the noise frequencies generated during a brake application. In modal analysis, a dual channel Fast Fourier Transform analyzer was used to measure the ratio of the response to a measured input force. During such analysis, the brake pad in the system was excited by either striking with an instrumented hammer or vibrating it with an electromagnetic shaker having a random or swept sine input. An accelerometer was mounted at various positions on the pad while it was excited in a uniform manner at a single point. The transfer of motion between the input to the output was recorded for a series of tests. This transfer function is a complex function having both a real and imaginary component. Commercialized modal analysis software package entitled "CAEDS" purchased from IBM was used to extract the modal parameters of the pad from these transfer functions to establish the pad modal model.

In frequency response analysis, structure vibration was evaluated on a finite element model of the brake system subjected to the excitation of the pad modal model. Maxim response was shown around the noise frequency (10100 Hz). The locations most sensitive to the generation of such frequency were identified as being adjacent the peripheral edge of the friction pad and not along the leading or trailing edge.

Figure 1:
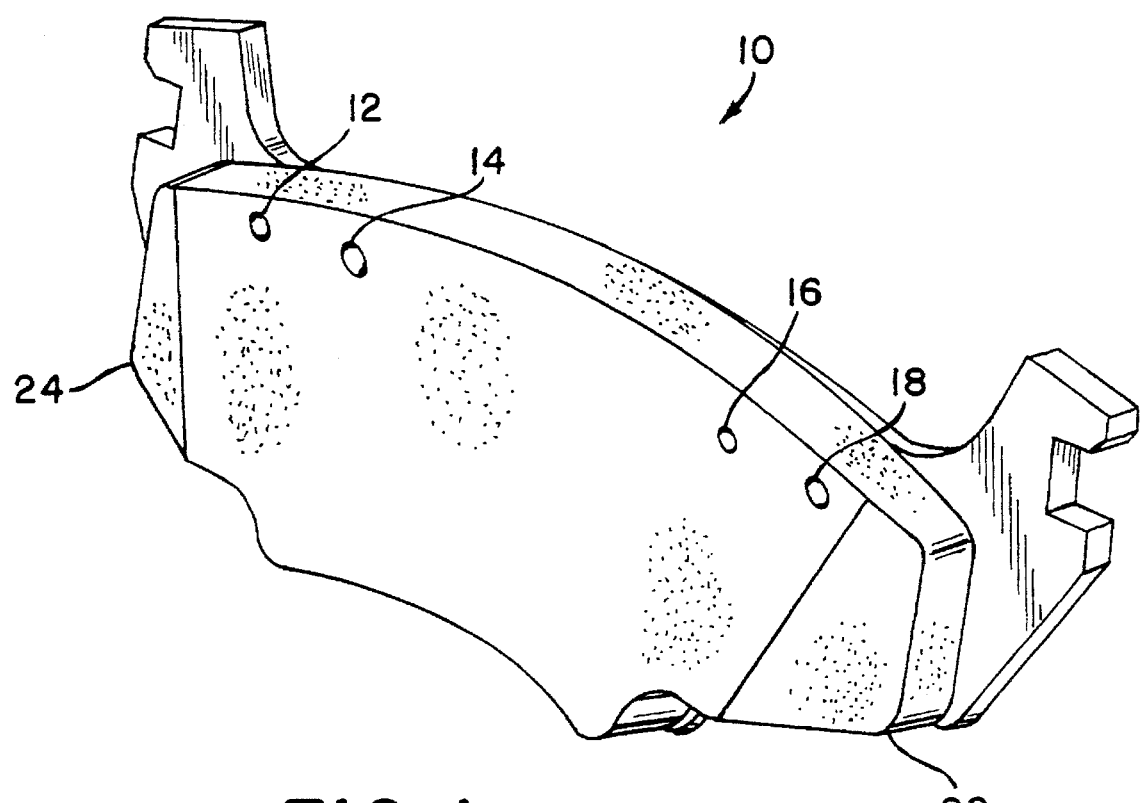
FIG. 1 is a schematic illustration of a friction pad for use in a disc brake which has been modified according to the present invention to reduce the generation of audible frequencies during a brake application.
Figure 3:
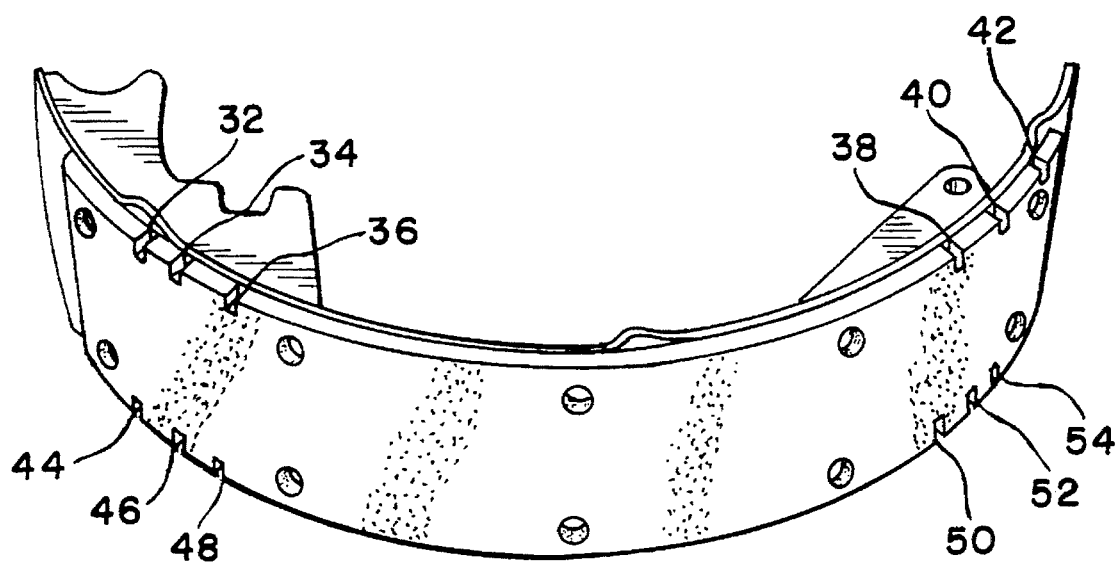
FIG. 3 is a schematic illustration of a friction pad for use in a drum brake which has been modified according to the present invention to reduce the generation of audible frequencies during a brake application.
Figures 2, 4:
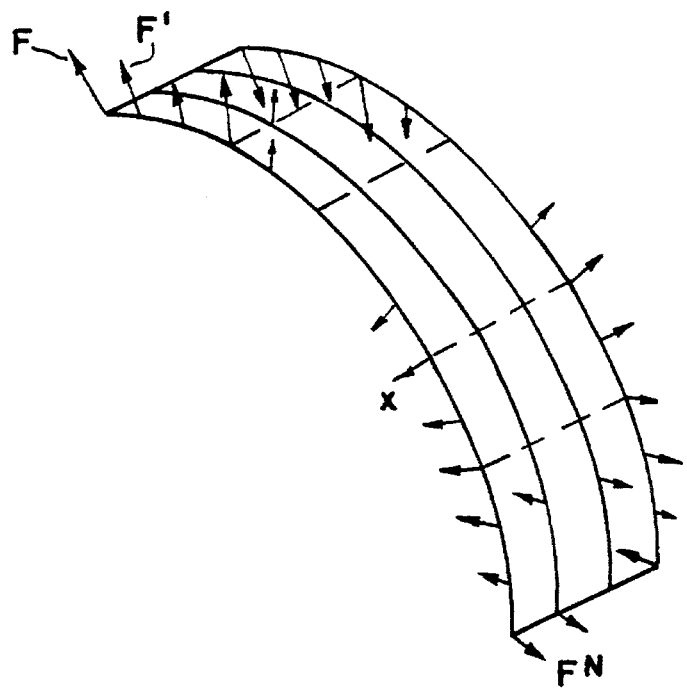
FIG. 2 is a table comparing the disc brake pad with and without the modification proposed by this invention.
FIG. 4 is the mode shape of a friction pad in a drum brake at a frequency which creates audible sounds.

FIG. 1 illustrates a friction pad 10 which has been modified by drilling holes 12, 14, 16, and 18 adjacent peripheral edge 20. The size and number of holes that are drilled through the friction pad 10 is a function of the frequency that is identified as creating the audible sound. In the instant test, only holes 14 and 16 were actually drilled and when the resulting friction pad 10 was tested, the average sound was reduced to 55 dB.

in order to confirm that modification of a friction pad by selectively removing a portion of the friction pad most sensitive to the generation of audible frequencies during a brake application, when modal analysis and frequency response analysis was performed on a friction member for a drum brake, using the modular analysis software package to develop a mode shape as shown in FIG. 4 was produced. As shown in FIG. 4, the length of the force vectors F, F', ... $F^{IV}$ indicate the most likely location on the friction pad where audible frequencies would occur. The friction pad 30 shown in FIG. 3 was modified by cutting slots 32, 34, 36, 38, 40, 42, 44, 46, 48, 50, 52, and 54 in the peripheral edge at locations where the force vectors indicate where audible frequencies were most likely to occur. It should be noted that the location of the slots are not in any set pattern on the friction pad 30 but it has been observed that the force vectors are more prominent at the leading edge 56 than at the trailing edge 58. Additional research has not yet been conducted to determine the optimize size of the slots but it is understood that sufficient width and length must be provided to reduce the stress that would produced in the material at that location through the audible frequency.

To obtain actual test data, a vehicle under Los Angeles City Traffic (LACT) test was evaluated with respect to noise generated during a stop from 35 miles per hour at a constant 7 ft/s deceleration with only the rear brakes being actuated. Noise is rated from #1 through #10 with #1 being unacceptable to #10 which is acceptable to most individuals. During this initial test, the brake system was rated #5-6 for cyclic squeal. To substantiate the position that modification of the friction pad through removal of a portion thereof would attenuate the development of audible noise, the friction pads for the rear brakes were removed and chamfers were ground into the inner and outer peripheral edges and leading and trailing edges. These modified friction pads were then replaced on the vehicle and the LACT testing resumed. During the remainder of the vehicle testing, the brake was rated at #10 which is acceptable for most application.

I claim:

1. In a brake having a friction member with a surface having a leading edge, inner and outer peripheral edges and a trailing edge which engages a rotating member to effect a brake application, said friction member and rotating member generating a plurality of frequencies of audible sounds, the improvement in a method of attenuating the audible sounds comprising the steps of:

performing modal and frequency response analysis of said brake to determine the natural frequencies generated during a brake application to develop a mode shape for said friction member as defined by force vectors;

analyzing the mode shape of said friction member to identify the force vectors corresponding to natural frequencies that create audible sounds;

identifying selected locations adjacent at least one of said peripheral edges corresponding to said force vectors of said mode shape, said force vectors corresponding to locations of said friction member most sensitive to generate said audible sounds; and modifying said friction member by removing selected portions from at least one of said peripheral edges of said friction member to change the stress relationship within the friction material and correspondingly the development of said natural frequency in said brake during a brake application.

2. The method as recited in claim 1 wherein said modifying step includes:

drilling holes in said friction member at said selected locations.

3. The method as recite in claim 2 wherein said modifying step further includes:

selecting the size of said holes as a function of the audible sound frequencies.

4. The method as recited in claim 3 wherein said step of drilling holes includes:

defining said locations to 6 KHz vibration frequencies as identified by said modal analysis, frequency response analysis and sensitivity analysis.

5. The method as recited in claim 1 wherein said modifying step includes:

cutting slots along a peripheral edge of said friction member at said selected locations.

6. The method as recited in claim 5 wherein said modifying step includes:

selecting the size of said slots as a function of said audible sound frequency.

7. The method as recited in claim 6 wherein said step of modifying includes:

locating said slots adjacent a leading edge of said friction member.

* * * * *